Jan. 1, 1963 W. C. MOORE 3,071,747
BATTERY HANDLE CONSTRUCTION
Original Filed Oct. 15, 1958 2 Sheets-Sheet 1
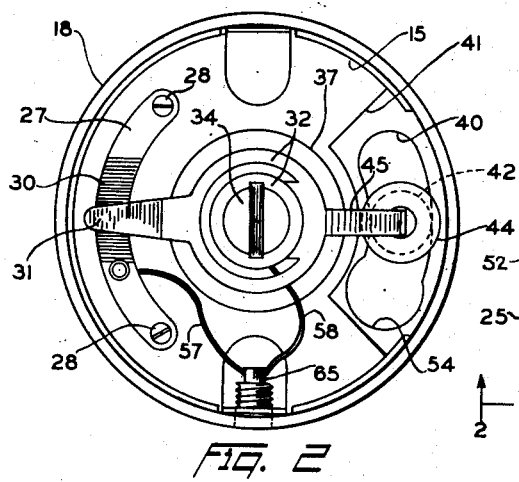
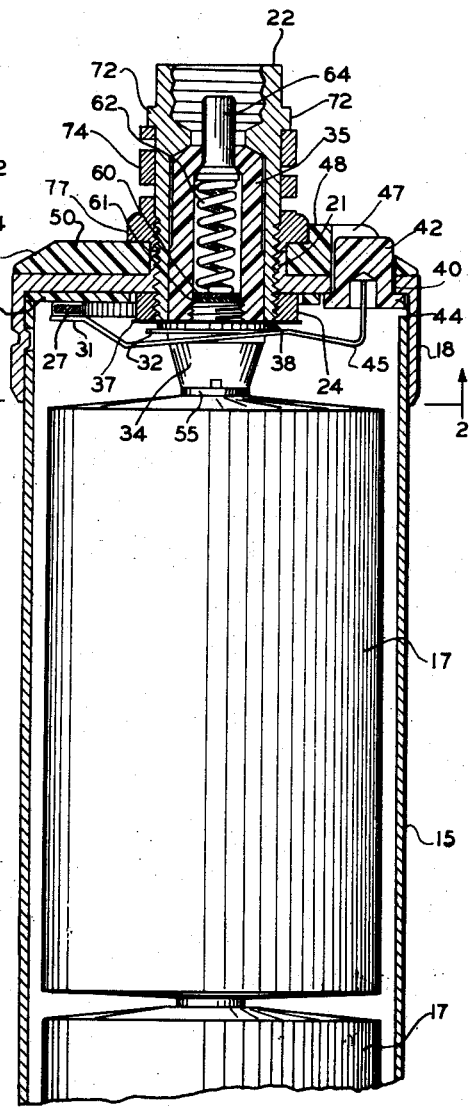
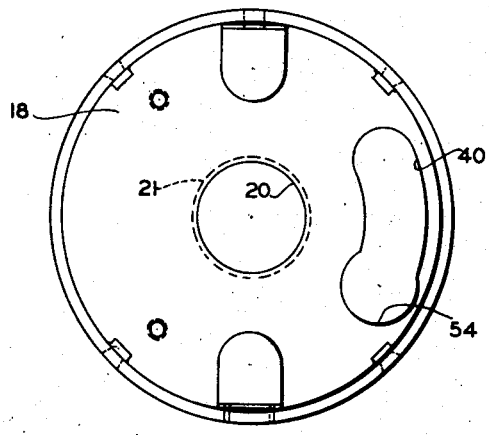
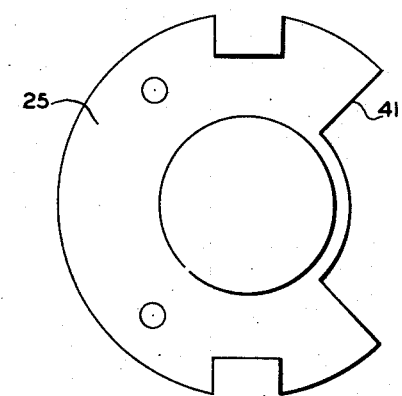
INVENTOR.
WILLIAM C. MOORE Jan. 1, 1963 W. C. MOORE 3,071,747
BATTERY HANDLE CONSTRUCTION
Original Filed Oct. 15, 1958 2 Sheets-Sheet 2

INVENTOR.
WILLIAM C. MOORE
BY Richard von K. Bruns
Atty.

United States Patent Office 3,071,747
Patented Jan. 1, 1963

3,071,747
BATTERY HANDLE CONSTRUCTION
William C. Moore, Skaneateles, N.Y., assignor to Welch Allyn, Inc., Skaneateles Falls, N.Y., a corporation of New York
Original application Oct. 15, 1958, Ser. No. 767,450. Divided and this application Oct. 13, 1960, Ser. No. 62,504
1 Claim. (Cl. 338—179)

This invention is a division of copending application Ser. No. 767,450, filed October 15, 1958, by the applicant, now abandoned. The invention disclosed herein relates generally to electrically illuminated medical diagnostic instruments, and has particular reference to an improved construction for battery handles used in connection with such instruments.

In electrically illuminated diagnostic instruments such as otoscopes, retinoscopes, ophthalmoscopes and the like, the battery handle provides a source of electrical energy and also serves as a convenient support for the instrument. Most battery handles are equipped with a rheostat which allows the operator to vary the intensity of the illumination, but heretofore the external control knob or disc for the rheostat has never—insofar as the applicant can ascertain—been provided with a positive off position. As a result, the rheostat control is often inadvertently left in the on position, or is accidentally moved to that position as the handle is being placed in its case, thereby causing unnecessary battery drainage.

In order to solve this problem, the present invention contemplates and has as its primary object the provision of a battery handle having a positive lock for the off position of the rheostat control whereby the operator will know without question when the control has been moved to this position, and inadvertent or accidental movement will thereafter be impossible.

Another very important object of the invention is to provide a battery handle construction which is easy to use and is positive and efficient in its operation.

Other objects and advantages of the invention will become apparent from the following detailed description thereof read in conjunction with the accompanying drawings which illustrate a representative embodiment of the invention for the purpose of disclosure.

In the drawings:

FIGURE 1 is a vertical section taken substantially centrally through the upper portion of a battery handle embodying the invention;

FIGURE 2 is a horizontal section through the battery handle taken substantially along line 2—2 of FIGURE 1;

FIGURE 3 is a bottom plan view of the top cap for the battery handle;

FIGURE 4 is a bottom plan view of the top cap insulating plate;

Figure 5:
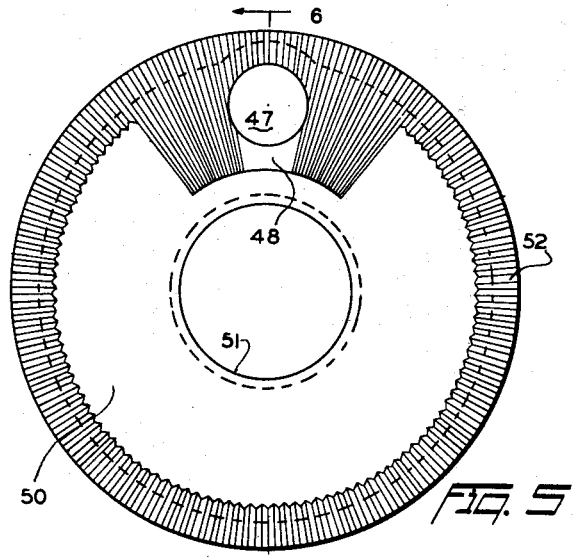
FIG. 5 is an enlarged top plan view of the rheostat contol knob.

Having reference now to the drawings, wherein like reference numbers designate the same part in each of the views, and with particular reference to FIGURE 1, 15 indicates the battery handle casing which is tubular in form and is adapted to contain dry cells 17, the battery handle being provided with a conventional removable bottom cap (not shown). Mounted on the upper end of the battery handle is a top cap 18 having a central opening 20 which is encircled on the upper side of the cap by a shallow upstanding flange 21. A connector member in the form of a generally tubular nipple 22 is threaded into this flange and central opening, and is locked in position by a nut 24 threaded onto the lower end of the nipple inside the top cap.

In the illustrated embodiment of the invention, the tubular casing, top and bottom caps, nipple, etc. are all formed of metal, and the underside of the top cap surrounding the nut 24 is covered by an insulator plate 25. A rheostat 27 is mounted on the insulator plate at one side of the nut as by screws 28, and the windings 30 thereof are adapted to be engaged by a spring metal contact 31. The contact is provided with an enlarged circular base portion 32 which is rotatably mounted on a screw 34 threaded into an insulator sleeve 35 that is frictionally secured in the nipple 22. An insulating washer 37 and a bearing washer 38 are also mounted on the screw between the contact base and the nut 24.

Diametrically opposite the rheostat 27, the top cap is provided with an opening in the form of an arcuate slot 40, the insulator plate 25 being cut away in the vicinity of this slot as is indicated at 41 in FIGURES 2 and 4. A non-conducting cylindrical button or plunger element 42 having a close sliding fit with the slot extends upwardly therethrough, FIGURE 1, the plunger being formed at its base with an annular flange 44 which is adapted to bear against the underside of the top cap adjacent the sides of the slot. The plunger 42 is urged upwardly into flange engaging position by a spring extension arm 45 formed integrally with the base portion 32 of the contact and disposed at 180° to the contact itself, as is best shown in FIGURE 2. Thus, it will be apparent that any movement of the plunger along the slot will operate through the extension arm to move the contact along the rheostat windings 30.

Figure 6:
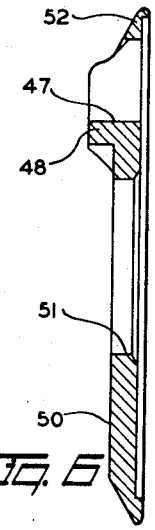
FIGURE 6 is a vertical section through the control knob taken substantially along line 6—6 of FIGURE 5.

The plunger projects above the top cap 18 where it is received with a close sliding fit in a bore 47 formed in a boss 48 of the external control knob 50 for the rheostat, the knob also being formed of a non-conducting material such as Bakelite or nylon. The knob or disc 50 is mounted on the battery handle in overlying relation to the top cap and is rotatable relative thereto about the top cap flange 21 which extends through a central opening 51 formed in the knob, FIGURES 5 and 6. The peripheral edge of the knob is bevelled and serrated as at 52 to facilitate turning the knob, and this in turn moves the plunger along the slot.

When the contact 31 is moved clockwise as viewed in FIGURE 2 until it no longer engages the rheostat windings 30, it is in its off position and the circuit through the battery handle is open. In accordance with the invention, a positive locking means is provided so that the control knob 50 cannot be inadvertently moved from the off position, and this comprises an enlarged circular portion 54 at one end of the arcuate slot 40 which is adapted to coact with the flange 44 on the plunger to prevent movement of the latter along the slot. To this end, the enlarged portion 54 is located diametrically opposite the off position of the contact and is adapted to receive the flange therein when the contact is in this position, the flange being moved up into the enlarged portion by the spring action of the extension arm 45. Since the overall diameter of the flange is greater than the width of the slot, movement of the plunger therealong will thus be prevented which in turn prevents movement of the external control knob.

To release the plunger 42 from its locking position, it is simply necessary to push it downwardly against the action of the extension arm 45 so that its flange 44 is moved out of the enlarged slot portion 54 and is below the underside of the top cap. This enables movement of the upper, smaller diametered portion of the plunger along the slot whereby the control knob can be turned to adjust the position of the rheostat contact 31. When the contact engages the rheostat windings 30, FIGURES 1 and 2, a circuit is completed from the center pole 55 of the upper battery through the screw 34, contact 31, rheostat windings 30 and lead wires 57, 58 to a metal contact disc 60 that is positioned within the insulator sleeve 35 of the nipple and is insulated from screw 34 by a fiber disc 61. From disc 60, the circuit continues through a conventional plunger spring 62 and plunger 64 which is adapted to engage one contact of whatever instrument is connected to the nipple. The other contact of the instrument completes the circuit through the nipple, top cap, and casing 15 to the bottom cap and a spring therein (not shown) which engages the base pole of the lower battery.

The reason for connecting the metal disc 60 and rheostat windings 30 to a binding post 65 by separate wires 57 and 58, instead of connecting the disc and windings directly to each other, is to permit the binding post to be utilized as a part of another circuit. In such case, the opposite side of the top cap would be provided with an additional binding post (not shown) in electrical contact therewith, so that another instrument could be connected to the binding posts and supplied with current from the same batteries.

Figure 8:
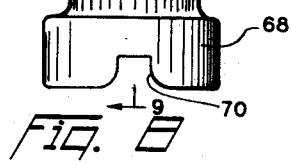
FIGURE 8 is an enlarged fragmentary side elevation of a diagnostic instrument adapted to be connected to the battery handle.

Each instrument that is adapted for use with the battery handle, such as the otoscope 67 shown diagrammatically in FIGURE 8, is provided with a hollow base or connector member 68 having a pair of diametrically opposed, upwardly extending recesses 70 and a pair of interior annular grooves 71 respectively communicating with the tops of said recesses. The battery handle nipple 22 is provided adjacent its upper end with a pair of diametrically opposed lugs 72 and, in connecting the instrument and handle together, the hollow base of the former is telescopically positioned over the end of the nipple with the recesses 70 registering with the lugs 72 and the lower end of the base engaging an axially compressible sleeve member 74 which encircles the nipple. Thereafter, downward movement of the instrument base against the sleeve will depress the latter and position the lugs in registry with the grooves 71, whereupon turning the instrument relative to the battery handle will cause the lugs to enter the grooves and couple the instrument and handle together.

The lug and groove coupling briefly described just above is well known in the art and is disclosed in greater detail in U.S. Patents 1,516,133 and 2,469,857, both assigned to the assignee of the present application. It has been found, however, that with this type of coupling there is a great deal of wear on the lugs 72 as the various instruments are constantly connected to and disconnected from the battery handle, and this eventually results in a loosening of the coupling and excessive play between the parts. In addition, the conventional compression springs that have been used heretofore to exert an upward force against the end of the instrument to hold it against turning gradually loose some of their resiliency so that instruments such as otoscopes, anoscopes and the like, which are subjected to turning forces during use, are able to turn easily relative to the handle and can become accidentally disengaged therefrom.

Figure 9:
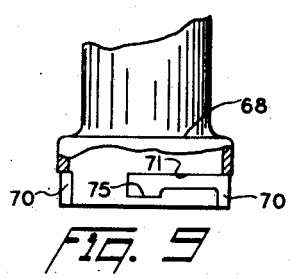
FIGURE 9 is a side elevation corresponding to FIGURE 8 with the base or supporting portion of the instrument rotated 90° and broken away to illustrate the connecting means therefor.
Figure 10:
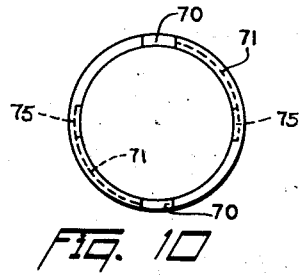
FIGURE 10 is a bottom plan view of the instrument of FIGURES 8 and 9.

The above mentioned problem has been solved by providing the improved spring sleeve 74, to be described, and also by providing for instruments such as otoscopes and anoscopes locking notches 75 at the end of the instrument grooves 71 in which the lugs 72 are received at the end of the turning movement of the instrument relative to the handle. Notches 75, as is best shown in FIGURE 9, extend below the main plane of the grooves so that when the lugs are brought into registry therewith, the previously depressed sleeve will force the instrument upwardly to seat the lugs in the notches. Since the sleeve thereafter continues to exert an upward force on the instrument, the lugs are firmly held in the notches and the instrument is thus positively locked against further relative rotation even though there may be some wear on the lugs. To disconnect the instrument from the handle, it is only necessary to press down on it to raise the lugs out of the notches and then rotate it until the lugs are in registry with the recesses 70 at which time they have moved out of the grooves.

Figure 7:
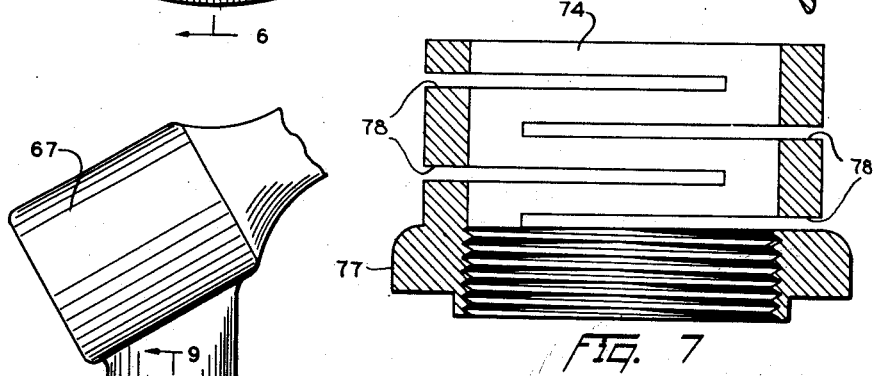
FIGURE 7 is a greatly enlarged vertical section through the spring means for the battery handle connector.

Referring to FIGURES 1 and 7, the axially compressible sleeve 74 is threadedly connected at its lower end to the nipple 22 and is adjusted axially thereon until its upper end is positioned directly below the lugs 72. In this position, a base flange 77 on the sleeve overlies and provides an upper guide for control knob 50, and there is a slight clearance between the sleeve and nipple above the threaded connection. Axial compressibility of the sleeve is obtained by cutting a plurality of alternately arranged transverse slots 78 therein as shown in FIGURE 7, the slots being spaced uniformly along the sleeve in the axial direction thereof and extending more than 180° around its circumference. Each of the slots thus cuts the sleeve more than half through, and the circumferential length of these slots determines the degree of compressibility or flexibility of the sleeve. The sleeve may be formed of a non-corrosive material such as beryllium copper alloy which makes an excellent and highly durable spring material so that the sleeve is able to effectively fulfill its instrument holding function, as above described, with no loss of resiliency through out the life of the battery handle.

From the foregoing description it will be apparent that the invention disclosed herein provides a greatly improved and highly practical battery handle construction and coupling means therefor. As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claim.

What is claimed is:

In a battery handle for electrically illuminated diagnostic instruments, an upstanding tubular casing adapted to contain a source of electrical energy, a top cap for said casing having a top opening in the form of an arcuate slot, a rheostat mounted in the casing below said top cap, said rheostat including resistive windings and a movable contact having an off position out of engagement with the windings, a rotatable control member for said rheostat contact mounted on the casing above said top cap, said control member having a vertical bore in registry with said arcuate slot, a cylindrical plunger mounted in said bore and extending downwardly through said slot, said plunger having a close sliding fit with said bore and slot, resilient means connecting said rheostat contact to the lower end of said plunger whereby rotational movement of said control member operates through the plunger to move the contact, said plunger terminating at its lower end in an annular flange, said resilient connecting means biasing said plunger flange upwardly against the underside of said top cap adjacent the sides of said slot during movement of the plunger along the slot, said slot having an enlarged portion at one end thereof for receiving said plunger flange, said resilient connecting means moving said flange up into said enlarged slot portion when said contact is in its off position to prevent movement of the plunger along the slot, the upper end of said plunger projecting above said control member when the plunger flange is positioned in said enlarged slot portion, said plunger being depressible to move the plunger flange out of said enlarged slot portion whereby movement of the plunger and contact can be effected by rotational movement of said control member.

References Cited in the file of this patent

UNITED STATES PATENTS

| | | |
|---|---|---|
| 1,516,133 | Allyn | Nov. 18, 1924 |
| 1,597,609 | Mabon | Aug. 24, 1926 |
| 1,655,700 | Hummel | Jan. 10, 1928 |
| 2,179,686 | Cohen | Nov. 14, 1939 |